United States Patent
Bradley et al.

(10) Patent No.: US 8,809,876 B2
(45) Date of Patent: *Aug. 19, 2014

(54) ABSORBING FILM

(75) Inventors: Michael Scott Bradley, Somerville, MA (US); Jonathan R. Tischler, Sharon, MA (US); Vladimir Bulovic, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1336 days.

This patent is subject to a terminal disclaimer.

(21) Appl. No.: 12/162,838

(22) PCT Filed: Feb. 14, 2007

(86) PCT No.: PCT/US2007/003675
§ 371 (c)(1),
(2), (4) Date: Oct. 8, 2009

(87) PCT Pub. No.: WO2007/095171
PCT Pub. Date: Aug. 23, 2007

(65) Prior Publication Data
US 2010/0051967 A1    Mar. 4, 2010

Related U.S. Application Data

(60) Provisional application No. 60/772,888, filed on Feb. 14, 2006.

(51) Int. Cl.
*H01L 29/72*    (2006.01)

(52) U.S. Cl.
USPC  257/80; 257/432; 257/E21.001; 257/E27.12; 257/E33.001

(58) Field of Classification Search
USPC ........ 257/80, 432, E21.001, E27.12, E33.001
See application file for complete search history.

(56) References Cited

U.S. PATENT DOCUMENTS

| 5,201,961 | A | 4/1993 | Suzuki et al. |
| 5,512,131 | A | 4/1996 | Kumar et al. |
| 6,007,928 | A | 12/1999 | Takeuchi et al. |
| 6,180,239 | B1 | 1/2001 | Whitesides et al. |
| 6,518,168 | B1 | 2/2003 | Clem et al. |
| 6,680,177 | B2 | 1/2004 | Mize |
| 7,799,422 | B2 * | 9/2010 | Tischler et al. ............... 428/338 |
| 2003/0124368 | A1 * | 7/2003 | Lynn et al. .................... 428/483 |
| 2003/0124638 | A1 | 7/2003 | Mize |

FOREIGN PATENT DOCUMENTS

| JP | 3263380 | 11/1991 |
| JP | 11060660 | 3/1999 |
| WO | WO 2004/030029 A2 | 4/2004 |

OTHER PUBLICATIONS

U.S. Appl. No. 11/265,109, filed Nov. 3, 2005, Tischler, et al.
U.S. Appl. No. 11/253,612, filed Oct. 20, 2005, Coe-Sullivan, et al.

(Continued)

*Primary Examiner* — Edward Wojciechowicz
(74) *Attorney, Agent, or Firm* — Steptoe & Johnson LLP

(57) ABSTRACT

Materials can be prepared in a layer-by-layer fashion on a patterned first substrate and subsequently transferred to a second substrate. The transfer step can preserve the pattern of the first substrate, such that the second substrate will bear a pattern of the transferred material. The material can be an electrostatic multilayer including a light absorbing dye, such as a J-aggregating cyanine dye.

29 Claims, 10 Drawing Sheets

(56) References Cited

OTHER PUBLICATIONS

Bourbon, S., et al., Syn. Metals, 1999, 101, 152.
Bradley, M., et al., Adv. Mater., 2005, 17, 1881.
Coe-Sullivan, S. et al., Adv. Func. Mater., 2005, 15, 1117-1124.
Decher, G., et al., Thin Solid Films, 1992, 210, 831.
Decher, G., Science, 1997, 277, 1232.
Era, M., et al., Chem. Phys. Lett., 1991, 178, 488.
Fery et al., Langmuir, 2001, 17, 3779.
Fukumoto, H., et al., Thin Solid Films, 1998, 329, 748.
Gates, B. et al., Chem. Rev., 2005, 105, 1171.
Geissler, M. et al., Adv. Mater., 2004, 16, 1249.
Hammond, P., Adv. Mater., 2004, 16, 1271.
Jelley, E., et al., Nature, 1936, 138, 1009.
Kayayama, H. et al., Anal. Chem., 1998, 70, 2254.
Krebs, F. et al., Directional Synthesis of a Dye-Linked Conducting Homopolymer, J. Org. Chem., 2003, vol. 68, p. 2463-2466.
Kumar, A. et al., App. Phys. Lett., 1993, 63, 2002-2004.
Kumar, A. et al., Langmuir, 1994, 10, 1498.
Makamba, H. et al., Electrophoresis, 2003, 24, 3607.
Mendelsohn et al., Langmuir, 2000, 16, 5017.
Nitsche, R. et al., Phys. Rev. B, 2004, 70, 195432.
O'Regan, B., et al., A Low-Cost, High-Efficiency Solar Cell Based on Dye-Sensitized Colloidal TiO2 Films, Nature, 1991, vol. 353, p. 737-740.
Park, J. et al., Adv. Mater., 2004, 16, 520.
Park, J. et al., Macromolecules, 2005, 38, 10542.
Peyratout, C. et al., J. Photochem. Photobiol. A-Chem., 2001, 142, 51.
Peyratout, C. et al., Photochem. Photobiol. Sci., 2002, 1, 87.
Peyratout, C. et al., Phys. Chem. Chem. Phys., 2002, 4, 3032.
Roncali, J., Conjugated Poly(thiophenes): Synthesis, Functionalization, and Applications, Chem. Rev., 1992, vol. 92, p. 711-738.
Rousseau, E. et al., Langmuir, 2000, 16, 8865.
Rousseau, E. et al., Photochem. Photobiol. Sci., 2002, 1, 395.
Santhanam, V. et al., Nano Lett., 2004, 4, 41-44.
Shiratori et al., Macromolecules, 2000, 33, 4213.
Stuganova, A. et al., J. Phys. Chem. B, 2002, 106, 11047.
Tischler, J., et al., Phys. Rev. Lett., 2005, vol. 95, 036401.
Wallace, G. et al., Conjugated Polymers: New Materials for Photovoltaics. Chem. Innov., 2000, vol. 30, No. 1, p. 14-22.
Wilbur, J. et al., Adv. Mater., 1994, 6, 600.
Xia, Y. et al., Ann. Rev. Mater. Sci., 1998, 28, 153.
Xia, Y. et al., Chem. Rev., 1999, 99, 1823.
Yoshino, K., et al., Novel Photovoltaic Devices Based on Donor-Acceptor Molecular and Conducting Polymer Systems, IEEE Trans. Elec. Dev., 1997, vol. 44, No. 8, p. 1315-1324.

\* cited by examiner

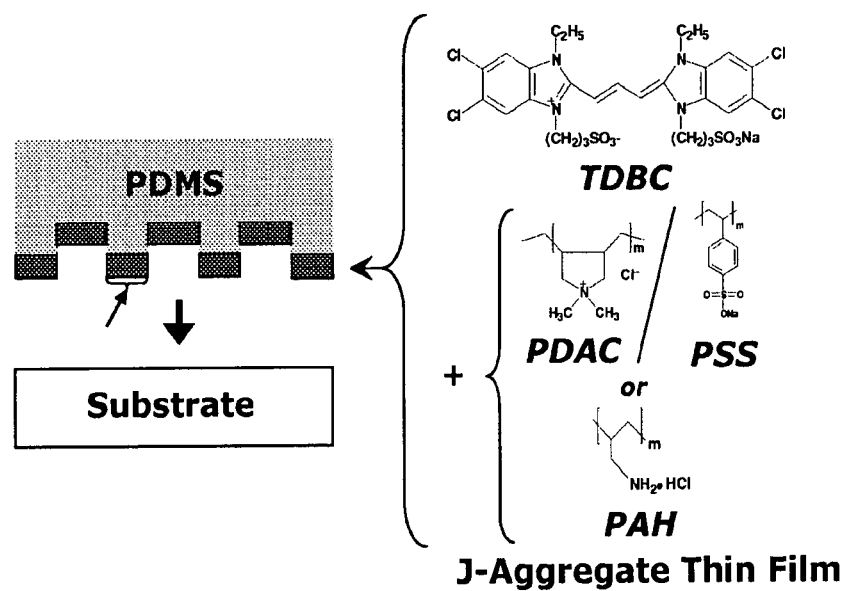
FIG. 1A
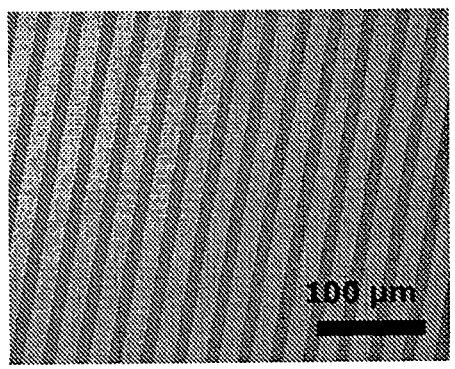
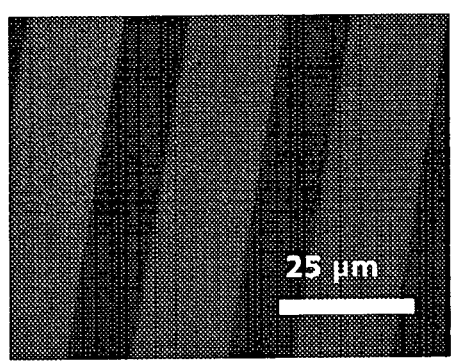
FIG. 1B          FIG. 1C

ABSORBING FILM

CLAIM OF PRIORITY

This application claims priority under 35 USC 371 to International Application No. PCT/US2007/003675, filed on Feb. 14, 2007, which claims priority to U.S. Provisional Application Ser. No. 60/772,888, filed on Feb. 14, 2006, each of which is incorporated by reference in its entirety.

FEDERALLY SPONSORED RESEARCH OR DEVELOPMENT

This invention was made with government support under Grant Number MDA972-00-1-0023, awarded by DARPA. The government has certain rights in the invention.

TECHNICAL FIELD

The present invention relates to a light absorbing film.

BACKGROUND

Light-emitting devices can be used, for example, in displays (e.g., flat-panel displays), screens (e.g., computer screens), and other items that require illumination. Accordingly, the brightness of the light-emitting device is one important feature of the device. Also, low operating voltages and high efficiencies can improve the viability of producing emissive devices.

Light-emitting devices can release photons in response to excitation of an active component of the device. Emission can be stimulated by applying a voltage across the active component (e.g., an electroluminescent component) of the device. The electroluminescent component can be a polymer, such as a conjugated organic polymer or a polymer containing electroluminescent moieties or layers of organic molecules. Typically, the emission can occur by radiative recombination of an excited charge between layers of a device. The emitted light has an emission profile that includes a maximum emission wavelength, and an emission intensity, measured in luminance (candelas/square meter ($cd/m^2$) or power flux ($W/m^2$)). The emission profile, and other physical characteristics of the device, can be altered by the electronic structure (e.g., energy gaps) of the material. For example, the brightness, range of color, efficiency, operating voltage, and operating half-lives of light-emitting devices can vary based on the structure of the device.

SUMMARY

In general, a high oscillator strength thin film can be applied to a surface. The film can have an absorption coefficient greater than $10^5$ $cm^{-1}$, for example, $10^6$ $cm^{-1}$ or larger. The thin films can have a high absorption coefficient. The films can be formed by adsorption into layered structures of charged species with strong dipole-dipole interactions between species. The films can be built by adsorption of species with alternating charge on a solid substrate e.g., glass, silicon, a polymer surface, or a previous polymer film disposed on a substrate, etc.

The high absorption coefficient arises from the interaction of dipoles in a plane perpendicular to the probe direction. The process used to form these films can allow for strong dipole interactions within the adsorbed layer. Additionally, the process can allow for precise deposition of a single physical layer of the dipole-dipole-interacting absorbing species. As a result, the dipole-dipole interactions in the plane of absorbing species perpendicular to the probe direction provide a high absorption constant in the thin film.

It can be desirable to deposit a high oscillator strength film on a substrate without exposing the substrate to a solvent. For example, if the light-absorbing film is to be included in a light emitting device, components of the device may not be compatible with solvent conditions required for assembling the film. It can therefore be advantageous to assemble the film on a first substrate which is robust to the assembly conditions, and subsequently transfer the film to a second substrate. The transfer step can be achieved without the use of a solvent. The first substrate can have a pattern of elevations and depressions. When the film is transferred from the first substrate to the second substrate, the elevated portions of the film can be transferred while the depressed portions remain on the first substrate. In this way, a pattern of light-absorbing film can be applied to the second substrate.

The solvent-free method enables incorporation of the J-aggregate films into a wider variety of device structures, without affecting the optical properties of other constituent films. The lateral patterning enabled by microcontact printing facilitates formation of patterned photonic devices based on J-aggregates and can enable in-plane demonstration of the strong-coupling phenomena recently demonstrated in the vertical direction in room-temperature thin film devices. See J. R. Tischler, et al., *Phys. Rev. Lett.* 2005, 95, 036401, which is incorporated by reference in its entirety. Additionally, by tuning the surface chemistry of the stamp surface, other methods of J-aggregate thin film formation on the stamp, such as Langmuir-Blodgett methods or spin-casting, can be used, allowing for microcontact printing of a wide variety of thin films of J-aggregating dyes.

In one aspect, a method of forming a light absorbing film includes forming an non-covalent multilayer including a light-absorbing material on a surface of a first substrate, and contacting the surface of the first substrate with a surface of a second substrate, thereby transferring at least a portion of the light absorbing material from the surface of the first substrate to the surface of the second substrate.

In another aspect, an optical device includes a substrate and an non-covalent multilayer including a light-absorbing material on predetermined region of a surface of the substrate.

In another aspect, a light emitting device includes a first electrode, a second electrode opposed to the first electrode, and a predefined region including a non-covalent multilayer including a light-absorbing material disposed between the first electrode and the second electrode.

The non-covalent multilayer can include a first layer interacting with a second layer via electrostatic interactions or via hydrogen-bonding interactions. Forming the non-covalent multilayer can include contacting the substrate with the light-absorbing material. Forming the non-covalent multilayer can include contacting the substrate with a multiply charged species. The multiply charged species can be a polyelectrolyte. The polyelectrolyte can be a polycation or a polyanion. Forming the non-covalent multilayer can include depositing at least one layer of a polycation and at least one layer of a polyanion. Forming the non-covalent multilayer can include depositing at least one layer of a polycation and at least one layer of the light-absorbing material. The method can include chemically modifying the surface of the first substrate prior to forming the non-covalent multilayer. The non-covalent multilayer can be crosslinked.

The surface of the first substrate can include a pattern including an elevation or a depression. A feature of the pattern can have a dimension of less than 1 millimeter, less than 100 micrometers, or less than 1 micrometer. The light-absorbing material can include a J-aggregate, which can include a cyanine dye. The non-covalent multilayer can have an absorption coefficient of at least $1\times10^5$ cm$^{-1}$, at least $5\times10^5$ cm$^{-1}$, or at least $1\times10^6$ cm$^{-1}$.

The second substrate can include a first electrode. The second substrate can include a charge transporting material. The method can include applying a second electrode over the first electrode, the charge transporting material and the transferred portion of the light absorbing material, thereby forming a light emitting device.

In another aspect, an optical device includes a substrate and a non-covalent multilayer including a light-absorbing material on predetermined region of a surface of the substrate. The non-covalent multilayer is adjacent to a light transmissive material having a substantially different index of refraction from an index of refraction of the non-covalent multilayer.

The optical device can be reflective at a wavelength where the non-covalent multilayer has an absorption coefficient of at least $1\times10^5$ cm$^{-1}$. The predetermined region can correspond to an image, letter, number, bar code, or combination thereof.

In another aspect, an optical device includes a plurality of dielectric layers and a non-covalent multilayer between at least two of the dielectric layers. The non-covalent multilayer includes a light-absorbing material on predetermined region of a surface of the substrate, wherein the non-covalent multilayer is adjacent to a light transmissive material having a substantially different index of refraction from an index of refraction of the non-covalent multilayer. The device can include a plurality of a non-covalent multilayer between at least two dielectric layers. The plurality of dielectric layers includes silica layers and titanic layers.

Other features, objects, and advantages will be apparent from the description and drawings, and from the claims.

BRIEF DESCRIPTION OF DRAWINGS

FIG. 1A schematically depicts a thin film on a patterned surface of a stamp. FIGS. 1B-1C are micrographs of patterned thin films transferred from a patterned stamp to a substrate.

DETAILED DESCRIPTION

Figure 2A:
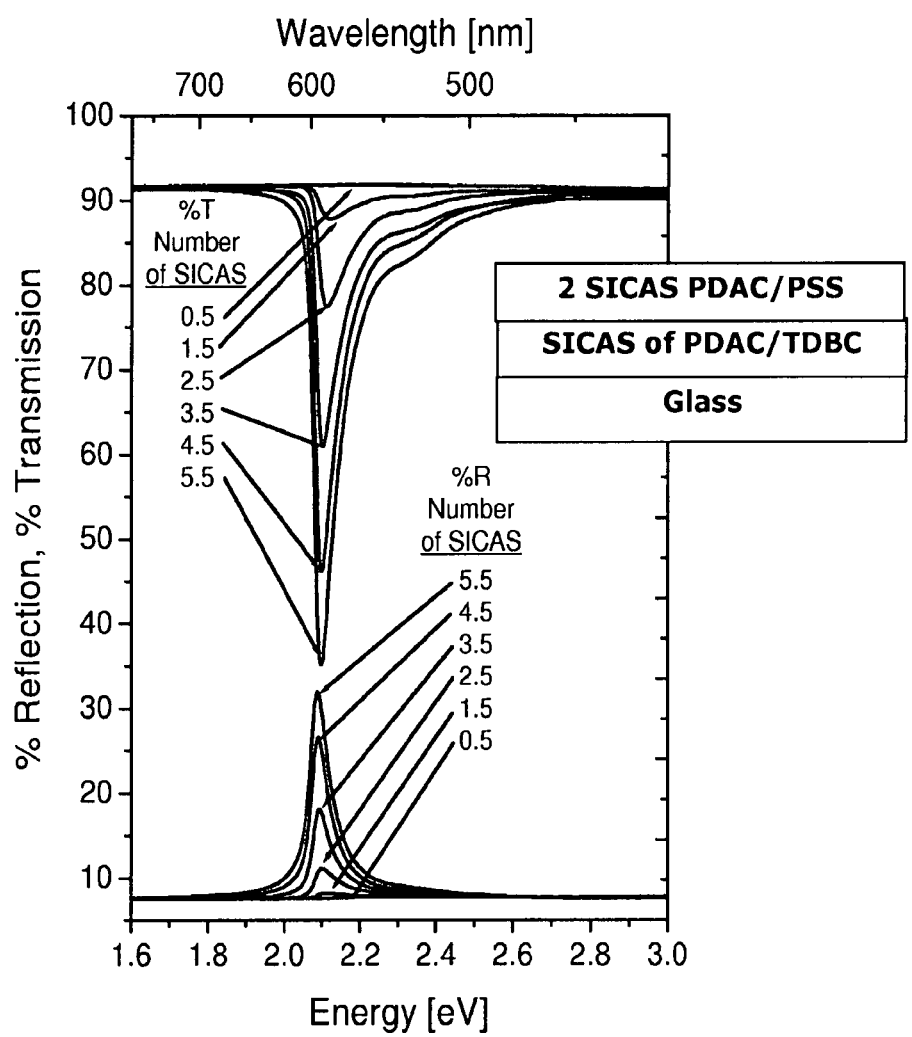
FIGS. 2A-2D are graphs depicting optical and physical properties of thin films.

Thin films having a high oscillator strength (i.e., absorption coefficient) can be made by alternately adsorbing two or more materials capable of non-covalent interaction onto a support or substrate from solution, where one material is a light absorbing material. The non-covalent interaction can be, for example, an electrostatic interaction, hydrogen bonding, or hydrophobic interactions. Selection of appropriate materials and assembly conditions can result in a film where the light absorbing material participates in strong dipole-dipole interactions, favoring a high absorption coefficient. The light absorbing material can be a dye capable of forming a J-aggregate.

Layers of light absorbing material, which can be positively or negatively charged, can be interspersed with layers of an oppositely charged material. The oppositely charged material can include a multiply charged species. A multiply charged species can have a plurality of charge sites each bearing a partial, single, or multiple charge; or a single charge site bearing a multiple charge. A polyelectrolyte, for example, can have a plurality of charge sites each bearing a partial, single, or multiple charge. A polyelectrolyte has a backbone with a plurality of charged functional groups attached to the backbone. A polyelectrolyte can be polycationic or polyanionic. A polycation has a backbone with a plurality of positively charged functional groups attached to the backbone, for example poly(allylamine hydrochloride). A polyanion has a backbone with a plurality of negatively charged functional groups attached to the backbone, such as sulfonated polystyrene (SPS), polyacrylic acid, or a salt thereof. Some polyelectrolytes can lose their charge (i.e., become electrically neutral) depending on conditions such as pH. Some polyelectrolytes, such as copolymers, can include both polycationic segments and polyanionic segments. The charge density of a polyelectrolyte in aqueous solution can be pH insensitive (i.e., a strong polyelectrolyte) or pH sensitive (i.e., a weak polyelectrolyte). Without limitation, some exemplary polyelectrolytes are poly diallyldimethylammonium chloride (PDAC, a strong polycation), poly allylamine hydrochloride (PAH, a weak polycation), sulfonated polystyrene (SPS, a strong polyanion), and poly acrylic acid (PAA, a weak polyanion). Examples of a single charge site bearing a multiple charge include multiply charged metal ions, such as, without limitation, $Mg^{2+}$, $Ca^{2+}$, $Zn^{2+}$, $Fe^{2+}$, $Fe^{3+}$, $Co^{2+}$, $Cu^{2+}$, $Cd^{2+}$, $Sn^{4+}$, $Eu^{3+}$, $Tb^{3+}$, and the like. Multiply charged metal ions are available as salts, e.g. chloride salts such as $CoCl_2$, $FeCl_3$, $EuCl_3$, $TbCl_3$, $CdCl_2$, and $SnCl_4$.

The film can include hydrogen bonding polymers, such as, for example, polyacrylamide (PAm), polyvinylpyrolidone (PVP), and polyvinyl alcohol (PVA). The light absorbing film can include more than two materials. One of these materials is the light absorbing material and one of the other materials is either a multivalent ionic species or hydrogen bonding polymer. Additional materials may be included in the film to promote crosslinking, adhesion, or to sensitize light emission or absorption.

The thin films can include one or several layers of a polyelectrolyte and one or more charged species with strong dipole-dipole interactions and any additional dopants. At least one of the charged species used for strong dipole-dipole interactions has a charge opposite that of the polyelectrolyte used for the scaffold. When sequentially applied to a substrate, the oppositely charged materials attract forming an non-covalent bilayer. The polyelectrolyte provides a scaffold for the species with strong dipole-dipole interactions to form a layered structure. These films are compatible with other processes of building thin films through alternate adsorption of charged species. The films can be interspersed in a multi-film heterostructure with other thin films.

The charged species with strong dipole-dipole interactions can be a single type of species, such as a single type of J-aggregating material (for example, a cyanine dye). Alternatively, several charged species with strong dipole-dipole interactions among the species could be used. The species used for the strong dipole-dipole interacting layer can have individual dipoles that can couple together to produce a coherent quantum mechanical state. This allows for the buildup of coherence in two dimensions, producing effects in the probe dimension perpendicular to the interacting species.

J-aggregates of cyanine dyes have long been known for their strong fluorescence. This strong fluorescence makes J-aggregates a desirable candidate for use in organic light-emitting devices (OLEDs), and these devices have been demonstrated. The layer-by-layer (LBL) technique for film growth, first developed by Decher et al., was extended to create thin films of J-aggregates, which have been to create an OLED with J-aggregates as emitters. See, for example, E. E. Jelley, *Nature* 1936, 138, 1009; M. Era, C. Adachi, T. Tsutsui, S. Saito, *Chem. Phys. Lett.* 1991, 178, 488; G. Decher, J. D. Hong, J. Schmitt, *Thin Solid Films* 1992, 210, 831; H. Fukumoto, Y. Yonezawa, *Thin Solid Films* 1998, 329, 748; S. Bourbon, M. Y. Gao, S. Kirstein, *Synthetic Metals* 1999, 101, 152; Bradley, M. S. et al., *Advanced Materials* 2005, 17, 1881; and provisional U.S. Patent Application No. 60/624, 187, filed Nov. 3, 2004, each of which is incorporated by reference in its entirety.

Layer-by-layer (LBL) processing of polyelectrolyte multilayers can be utilized to fabricate conformal thin film coatings with molecular level control over film thickness and chemistry. Charged polyelectrolytes can be assembled in a layer-by-layer fashion. In other words, positively- and negatively-charged polyelectrolytes can be alternately deposited on a substrate. One method of depositing the polyelectrolytes is to contact the substrate with an aqueous solution of polyelectrolyte at an appropriate pH. The pH can be chosen such that the polyelectrolyte is partially or weakly charged. The multilayer can include a number of non-covalent bilayers. An non-covalent bilayer is the structure formed by the ordered application of a multiply charged species (e.g., a polyelectrolyte or metal ion) and an oppositely charged material (e.g., a light absorbing material, polyelectrolyte or counterion). The properties of weakly charged polyelectrolytes can be precisely controlled by changes in pH. See, for example, G. Decher, Science 1997, 277, 1232; Mendelsohn et al., Langmuir 2000, 16, 5017; Fery et al., Langmuir 2001, 17, 3779; Shiratori et al., Macromolecules 2000, 33, 4213, each of which is incorporated by reference in its entirety.

The process conditions used in the deposition of the film can be varied. Some process conditions that can be varied include concentration, temperature, pH, salt concentration, co-solvent, co-solvent concentration, and deposition time. The temperature can be varied between, for example, 0° C. and 100° C., or between 5° C. and 80° C. The pH can be varied from 0.0 to 14.0, or from 3.0 to 13.0. The salt concentration can range from deionized (i.e., no salt added) to 1 M. NaCl and KCl are examples of salts used. Solutions can be prepared using water as the sole solvent, or with water and a co-solvent, such as an organic solvent. Some exemplary organic solvents include methanol, ethanol, isopropanol, acetone, acetic acid, THF, dioxane, DMF, and formamide. The deposition time can be 1 second or less; 30 seconds or less; 1 minute or less; 5 minutes or less; 10 minutes or less; 1 hour or less; or several hours or more. In some circumstances, deposition times will be in the range of 1 second to 10 minutes.

The density of the film can be modified by repeatedly immersing the substrate into solutions of the light absorbing material prepared with different process conditions. As an example, by cyclically immersing into a solution held at a temperature of 20° C. and then in a second solution held at 60° C. The crystallinity of the resultant film is enhanced and dye density increased compared to films not treated in this manner.

The film can include a plurality of bilayers, such as fewer than 100, fewer than 50, fewer than 20, or fewer than 10 bilayers. The film can include 0.5, 1.0, 1.5, 2.0, 2.5, 3.0, 3.5, 4.0, 4.5, 5.0, 5.5., 6.0, 6.5, 7.0, 7.5, 8.0, 8.5, 9.0, 9.5, or 10.0 bilayers. A bilayer includes a layer of multiply charged material and a layer of light absorbing material. In some embodiments, the film can include bilayers substantially free of light absorbing material, e.g., bilayers where one layer includes a polycation and the other layer includes a polyanion. Including bilayers that are substantially free of light absorbing material can be advantageous, for example, in altering the adhesion of the film to a substrate or in altering the thickness of the film.

The light absorbing film can be deposited on a hydrophilic or hydrophobic substrate. The film can be deposited onto conducting (e.g., metallic), semiconducting, or insulating layers; or bio-compatible materials, examples of which are a polymer film that is hydrophilic or hydrophobic, an oxide layer, a metal oxide layer, a metal layer, a DNA-coated surface, and others. Examples of a hydrophilic polymer layer include polyelectrolytes and hydrogen bonding polymers; amino acids; proteins; and hydrophilic polymers. Examples of hydrophobic polymers include PDMS, Poly-TPD, and MEH-PPV. Metal oxide layers include, for example alumina, titania, and zinc oxide. Examples of semiconducting layers are layers of Si, Ge, GaAs, GaN, AlGaAs, GaAsP, CdSe, CdS, ZnS, and metal halides, such as AgCl, AgBr, and AgI. Adhesion of the light absorbing film to the substrate can be promoted by varying the process conditions described above. The light absorbing film can be made on an elastomeric substrate, such as a PDMS substrate. A surface of the elastomeric substrate can bear a pattern of elevations and depressions. The surface of the elastomer can be chemically modified before the light absorbing film is formed on the surface.

High oscillator strength thin films, methods of making such films, and optical properties of such films are described in U.S. patent application Ser. No. 11/265,109, filed Nov. 3, 2005, which is incorporated by reference in its entirety. The layer-by-layer deposition process can conveniently coat a substrate. Forming patterns of deposited material with layer-by-layer processing can be more difficult. Advantageously, layer-by-layer processing can be combined with microcontact printing to apply a pattern of layer-by-layer type materials (e.g., polyelectrolyte multilayers, high oscillator strength thin films, and the like) to a substrate.

Microcontact printing provides a method for applying a material to a predefined region on a substrate. See, for example, A. Kumar and G. Whitesides, *Applied Physics Letters*, 63, 2002-2004, (1993); and V. Santhanam and R. P. Andres, *Nano Letters*, 4, 41-44, (2004), each of which is incorporated by reference in its entirety. The predefined region is a region on the substrate where the material is selectively applied. The material and substrate can be chosen such that the material remains substantially entirely within the predetermined area. By selecting a predefined region that forms a pattern, material can be applied to the substrate such that the material forms a pattern. The pattern can be a regular pattern (such as an array, or a series of lines), or an irregular pattern. Once a pattern of material is formed on the substrate, the substrate can have a region including the material (the predefined region) and a region substantially free of material. In some circumstances, the material forms a monolayer on the substrate. The predefined region can be a discontinuous region. In other words, when the material is applied to the predefined region of the substrate, locations including the material can be separated by other locations that are substantially free of the material.

In general, microcontact printing begins by forming a patterned mold. The mold has a surface with a pattern of elevations and depressions. A stamp can be formed with a complementary pattern of elevations and depressions, for example by coating the patterned surface of the mold with a liquid polymer precursor that is cured while in contact with the patterned mold surface. The stamp can then be inked; that is, the stamp can be contacted with a material which is to be deposited on a substrate. The material becomes reversibly adhered to the stamp. The inked stamp is then contacted with the substrate. The elevated regions of the stamp can contact the substrate while the depressed regions of the stamp can be separated from the substrate. Where the inked stamp contacts the substrate, the ink material (or at least a portion thereof) is transferred from the stamp to the substrate. In this way, the pattern of elevations and depressions is transferred from the stamp to the substrate as regions including the material and free of the material on the substrate. Microcontact printing and related techniques are described in, for example, U.S. Pat. Nos. 5,512,131; 6,180,239; 6,518,168, and U.S. application Ser. No. 11/253,612, filed Oct. 21, 2005, each of which is incorporated by reference in its entirety.

The basic steps in the microcontact printing process as described as follows. First, a silicon master is made using standard semiconductor processing techniques which define a pattern on the silicon surface, for example a pattern of elevations and depressions (alternatively, for a non-patterned deposition, a blank Si master can be used). Poly dimethyl siloxane (PDMS, for example Sylgard 184) precursors are then mixed, degassed, poured onto the master, and degassed again, and allowed to cure at room temperature (or above room temperature, for faster cure times). The PDMS stamp, having a surface including the pattern of the silicon master, is then freed from the master, and cut into the desired shape and size. This stamp can then optionally be modified with a surface chemistry layer, selected to readily adhere and release the ink as needed. The surface chemistry layer can be both a barrier to stamp swelling by the ink solvent, and an adhesion/release layer for the ink. The chemical nature of the surface chemistry layer can depend on the chemical nature of the ink to be applied to the stamp. In some circumstances, surface chemistry layer can be hydrophobic, for use with hydrophobic inks. For example, aromatic organic polymers deposited by chemical vapor deposition, can be used as a surface chemistry layer. See, for example, S. Coe-Sullivan, et al., *Advanced Functional Materials*, 15, 1117-1124 (2005), which is incorporated by reference in its entirety. Application of the surface chemistry layer by chemical vapor deposition can result in a conformal coating of the shaped stamp. The surface chemistry layer can be chosen to compatible with spreading of chloroform-solvated inks. In other circumstances, the surface chemistry layer can be hydrophilic, e.g., for use with protic solvents such as water or solvent mixtures including water. A hydrophilic surface chemistry layer can be prepared, for example, by exposing the stamp to an oxygen plasma. The surface chemistry layer can be further modified by exposure to basic conditions. Basic conditions can impart a negative charge to the surface chemistry layer, which can be desirable for a positively charged ink, e.g., a polycation.

Ink is then applied to the stamp. The ink can be applied by a wide variety of methods, including without limitation, dip coating, spin coating, ink jet printing, or sequential immersion in cationic and anionic solutions (SICAS). See, for example, U.S. patent application Ser. No. 11/253,612, filed Oct. 21, 2005, which is incorporated by reference in its entirety. SICAS can be used to ink the stamp, for example, when the ink to be transferred includes a polyelectrolyte multilayer. The inked stamp can then be contacted to a substrate, and gentle pressure applied for a period of time (e.g., from about 1 second to about 10 minutes, or from about 10 seconds to about two minutes) to transfer the ink to the new substrate.

For optical applications, the thin films can be deposited in vertical, lateral, and three dimensional structures. In vertical structures, the films can be embedded in a specific position within a layered material stack that forms a device. In a lateral structure, the patterned layers, such as 1-D and 2-D gratings, can both diffract light and serve as a medium for invoking the in-plane strong coupling phenomenon.

The high reflectance (FIGS. 2A and 3A) of the films can allow the generation of monochrome or multi-chrome reflective patterns, such as for commercial logos on appliances and consumer electronics, for example. The patterned reflective films can also be used for identification tagging. For example, the film can be deposited in a pattern that identifies the item on which the film is deposited. This identifying pattern can be, for example, text, an identification number, bar code, or the like.

Additionally, patterned deposition will allow these films to be incorporated in electrical and optoelectronic devices such as chemical sensors, organic light emitting devices, photovoltaics, photodetectors, and field effect transistors.

EXAMPLES

Thin films of J-aggregates were prepared on an elastomer stamp, and then, using microcontact printing, stamp-transferred onto a substrate with appropriate surface chemistry. See, for example, P. T. Hammond, *Adv. Mater.* 2004, 16, 1271; and J. Park, P. T. Hammond, *Adv. Mater.* 2004, 16, 520, each of which is incorporated by reference in its entirety. The films were prepared through electrostatic adsorption on PDMS (polydimethylsiloxane) elastomer stamps, by sequential immersions in cationic and anionic solutions (SICAS). The J-aggregating cyanine dye used was the anion TDBC (5,6-dichloro-2-[3-[5,6-dichloro-1-ethyl-3-(3-sulfopropyl)-2(3H)-benzimidazolidene]-1-propenyl]-1-ethyl-3-(3-sulfopropyl) benzimidazolium hydroxide, inner salt, sodium salt). Other dyes can be used. The choice of cationic material used with TDBC in the film can determine how the film is prepared. If a strong polycation was used, such as poly(allyldimethylammonium chloride) (PDAC), the LBL deposition sequence was similar to that previously described for J-aggregate thin films grown on glass. See M. S. Bradley, J. R. Tischler, V. Bulovic, *Adv. Mater.* 2005, 17, 1881, which is incorporated by reference in its entirety. When using PDAC, the PDMS stamp was pretreated with 2 SICAS of PDAC and the strong polyanion PSS (poly(sodium-4-styrenesulfonate)) prior to undergoing SICAS of PDAC/TDBC. If a weak polycation was used instead, such as poly(allylamine hydrochloride) (PAH), no PDMS pretreatment was applied.

Methods for growing LBL J-aggregate thin films on PDMS (polydimethylsiloxane) μCP stamps have been developed for the purpose of stamping those films into devices. One such method, shown in FIG. 1A-1C, involves replacing the strong polycation PDAC with the weak polycation PAH (poly(allylamine hydrochloride)) during the J-aggregate growth. The hydrophobic backbone of PAH facilitates adsorption onto hydrophobic surfaces such as PDMS, as described by Park et al. See, for example, J. Park, P. T. Hammond, *Adv. Mater.* 2004, 16, 520, which is incorporated by reference in its entirety.

FIG. 1A illustrates the stamping method and the structural formulas of TDBC, PDAC, PSS and PAH. The stamp can be flat or, for soft lithography, patterned PDMS. Patterned PDMS stamps can be created by curing PDMS on silicon molds. J-aggregate thin films can be created in a layer-by-layer (LBL) process in which substrates undergo sequential immersions in cationic and anionic solutions (SICAS). The J-aggregating cyanine dye can be TDBC, an anionic dye. PAG can be directly substituted for PDAC in the J-aggregate thin film growth. FIGS. 1B and 1C show optical microscope images of a patterned 3-aggregate LBL thin film transferred onto glass. FIG. 1B shows a patterned, 3 SICAS PAH/TDBC film transferred from a patterned PDMS stamp in a reflectance mode image. FIG. 1C is the same 3 SICAS patterned film shown in photoluminescence with green light excitation, revealing sub-micron roughness in pattern definition.

Stamps were produced using Sylgard 184-brand PDMS (polydimethylsiloxane), made by Dow Corning. The PDMS base and curing agent were mixed 10:1 and cured for over 5 hours at 60° C. To create patterned PDMS stamps, the PDMS mixture was poured onto a silicon master and then cured. For flat stamps, the air-exposed surface of the PDMS was used due to the rough surface of the Petri dish in which the PDMS was cured. The stamps were cut from the PDMS and mounted on glass slides using commercial fast-cure epoxy. TDBC was obtained from Nippon Kankoh Shikiso Kenkyusho Co., Ltd. (CAS 28272-54-0). Polyelectrolytes PDAC, poly(diallyldimethylammonium chloride), 35% by weight in water, $M_w$<100,000 (CAS 26062-79-3); PSS, poly(sodium-4-styrenesulfonate), $M_w$~1,000,000 (CAS 25704-18-1); and PAH, poly(allylamine hydrochloride), $M_w$~70,000 (CAS 71550-12-4) were obtained from Sigma-Aldrich.

The dye solvent and rinses for the dye adsorption step were deionized (DI) water with pH of 5 to 5.5. The effect of pH on TDBC has been previously documented (see I. A. Struganova, et al., *J. Phys. Chem. B* 2002, 106, 11047, which is incorporated by reference in its entirety). Except for the PAH solvent, the polyelectrolyte solvents and rinses for the polyelectrolyte adsorption step were DI water. The PAH solvent was DI water plus 0.01 M sodium chloride, and the pH of the solvent was raised to between 7 and 8 using sodium hydroxide. Sodium chloride was AR-brand from Mallinckrodt. Sodium hydroxide was obtained from EM Science.

A standardized routine was used to prepare the dye and polyelectrolyte solutions. The dye solution was approximately $5 \times 10^{-5}$ M. Once the dye was added to the dye solvent, the dye bucket was sonicated in an ultrasonic bath for 30 minutes. The dye was then mixed with a one-inch magnetic spin bar for 10 minutes, sonicated for 20 minutes, mixed for 5 minutes, and finally sonicated for 5 minutes. The polyelectrolyte solutions were all approximately $3 \times 10^{-2}$ M, measuring by monomeric units. The polyelectrolyte solutions were prepared using the same time intervals for mixing/sonication as the dye solution preparation, except sonication and mixing steps were interchanged. Care was taken throughout the deposition to shield the dye solution and samples from light.

Prior to deposition of PDAC/TDBC films onto the stamps, the mounted PDMS stamps were pretreated with oxygen plasma for 2 minutes in a Plasma Preen system. The stamps were then soaked in a 1 M sodium hydroxide in DI water (pH 14) solution for 40 minutes. The strong basic solution was used to make the silanol groups on the PDMS surface have a largely negative charge, as described previously for LBL films in microfluidic applications. See, e.g., H. Makamba, et al., *Electrophoresis* 2003, 24, 3607; and H. Katayama, et al., *Anal. Chem.* 1998, 70, 2254, each of which is incorporated by reference in its entirety. The stamps and rack were then immersed in a DI water rinse, and finally underwent two sequential immersions in cationic and anionic solutions (SICAS) of PDAC and PSS, using the standard adsorption step times. For both methods in this study, the LBL depositions were performed using an automated Leica Autostainer XL. The cation adsorption step consisted of dipping the slides in cationic solution for 5 minutes and in the three rinses for two minutes, two minutes, and one minute, respectively. The anion adsorption step used the same time intervals as those used in the cation adsorption step. After the pretreatment, the stamps underwent varying numbers of SICAS of PDAC and TDBC to build the J-aggregate thin films.

The stamps used for PAH/TDBC film growth did not undergo any significant pretreatment. The mounted stamps were rinsed with DI water three times prior to deposition to remove dust particles and then left immersed in DI water until the start of the deposition. The first PAH adsorption step was extended to 30 minutes to allow extra time for the initial adsorption of PAH onto PDMS via hydrophobic interactions (see J. Park, P. T. Hammond, *Adv. Mater.* 2004, 16, 520). The stamps then underwent varying numbers of SICAS of PAH and TDBC to build the J-aggregate thin films.

Upon removal from the stainer, the stamps were dried using nitrogen gas. Prior to microcontact printing, glass substrates were cleaned with a detergent solution (Micro-90), acetone, and isopropanol. The acetone, isopropanol, and methanol used in this study were OmniSolv-brand solvents made by EMD Chemicals. The substrates were then treated with oxygen plasma for six minutes in a Plasma Preen system. The stamps were gently separated from their mounts using tweezers. The microcontact printing procedure was as follows: the stamps were picked up by hand, flipped over, and pressed into contact with the glass substrates. Gentle pressure was applied to the backs of the stamps to remove any air bubbles that might have been trapped between the stamp and substrate. The stamps were left in contact with the glass for at least one minute and then removed by lifting one edge of the stamp and peeling the stamp away from the glass. The transferred films on the glass substrates were then characterized.

Thin films of PDAC/TDBC grown directly on untreated PDMS were not morphologically stable. To increase film stability, the PDMS stamps were treated with oxygen plasma to form a glass-like layer on the surface of PDMS; then dipped in a strongly basic solution, pH 14 sodium hydroxide in deionized (DI) water, to give a high density of negative charge to the surface layer; and lastly subjected to 2 SICAS of PDAC/PSS. See, for example, H. Makamba, et al., *Electrophoresis* 2003, 24, 3607; and H. Katayama, et al., *Anal. Chem.* 1998, 70, 2254, each of which is incorporated by reference in its entirety. The PDAC/PSS layer, grown on the negatively-charged PDMS, formed a thin polyelectrolyte film capable of supporting the J-aggregate thin films of PDAC/TDBC.

When the weak polycation PAH is substituted for PDAC in the LBL J-aggregate thin film growth process, and PAH/TDBC films were grown directly on the PDMS stamps with no pretreatment steps necessary. See J. Park, P. T. Hammond, *Adv. Mater.* 2004, 16, 520, which is incorporated by reference in its entirety.

The atomic force microscopy (AFM) data were collected on a Digital Instruments D3000 Scanning Probe Microscope in tapping mode using phosphorus-doped silicon tips from Veeco. The optical data were collected using a Cary 5E UV-Vis-NIR spectrophotometer. The transmission data were collected with the light beam at normal incidence, $\theta=0°$. The reflectance data were collected in a V-W setup with the light beam incidence at $\theta=7°$ using the Cary Specular Reflectance Accessory in Absolute Reflectivity mode.

After LBL growth was complete, the stamps were dried using a stream of nitrogen gas. The J-aggregate thin films were then stamp-transferred to clean, oxygen-plasma-treated glass slides for analysis. A section of each film was manually scratched, and the step height was profiled with an atomic force microscope (AFM) to determine film thickness. For each film, near-normal spectral reflectance was measured at $\theta=7°$ and transmittance at $\theta=0°$, where $\theta$ was the angle away from the surface normal. The complex indices of refraction ($\tilde{n}=n+iK$) for the stamped LBL J-aggregate thin films were determined by fitting these data with a previously described regression method, based on Kramers-Kronig (KK) relations and a thin film dielectric model using propagation and matching matrices. See, for example, M. S. Bradley et al., *Adv. Mater.* 2005, 17, 1881; and R. Nitsche, T. Fritz, *Phys. Rev. B* 2004, 70, 195432, each of which is incorporated by reference in its entirety.

Figure 2B:
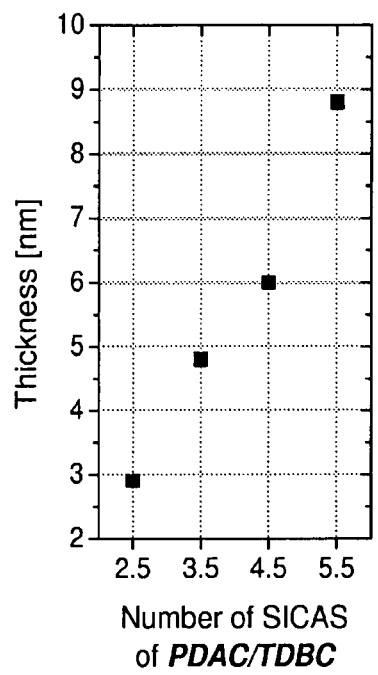
Figure 2C:
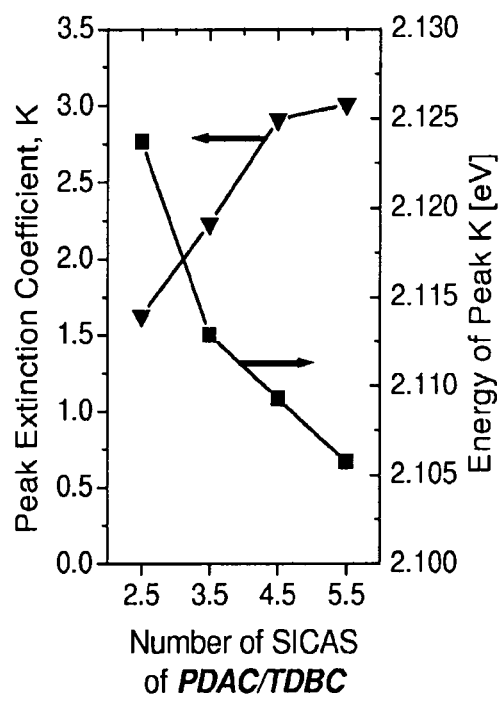
Figure 2D:
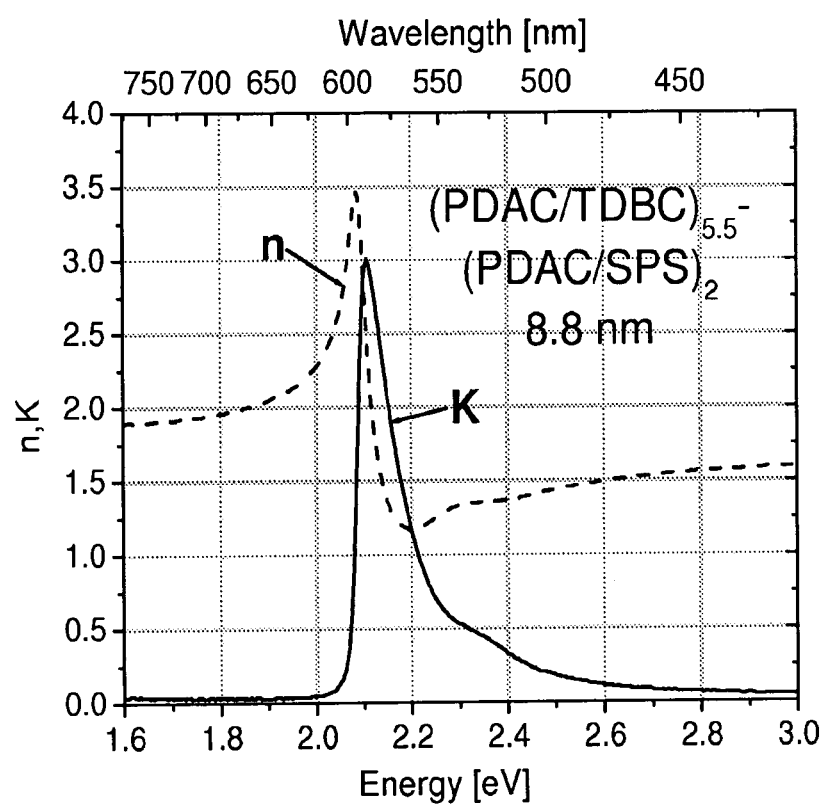

FIGS. 2A-2D summarize the measurements and results of KK regression on stamped PDAC/TDBC J-aggregate thin films. FIG. 2A shows reflectance and transmittance data from stamped films grown with varying numbers of SICAS. FIG. 2B shows the measured thicknesses of the stamped films. FIG. 2C summarizes the results of KK regression, performed using transmittance data from FIG. 2A. FIG. 2D shows the real, n, and imaginary, K, part of the index of refraction across the measured spectrum for a representative sample, a 5.5 SICAS PDAC/TDBC stamped film with a measured film thickness of 8.8 nm.

It should be noted that reflectance data are generally used to generate KK regression, in part because transmittance measurements can be affected by light scattering in the film. In this study, however, using reflectance measurements in the KK regression would have lead to an overestimate of the peak thin film absorption constant because thicker film build-up, which sometimes occurs on the periphery of the stamped region, was detected by our reflectance spectrometer. The size of the illuminated spot was controlled when making transmittance measurements, so that film build-up on the periphery of the stamped region was not measured. Using the indices of refraction KK-derived from transmittance measurements, the expected reflectance was calculated. The calculated values were at most 5 to 10% lower than the measured reflectances. Because the measured reflectances were higher than those calculated by our model, the indices of refraction derived from transmittance are not significantly affected by light scattering. Consequently, the calculated peak $\alpha$ derived from the imaginary part of the index of refraction, K, was a lower bound to the actual physical value of $\alpha$.

Using the results of the KK regressions, the peak linear thin film absorption constant was calculated from the peak in K, using the formula $\alpha=4\pi K(\lambda)/\lambda$, where $\lambda$ is the wavelength of light in centimeters. For the 5.5 SICAS PDAC/TDBC film the peak extinction coefficient is K=3.0 at $\lambda$=590 nm (FIG. 2D), which corresponded to a linear absorption constant of $\alpha$=6.4×$10^5$ cm$^{-1}$. This value was 35% lower than that reported previously for a PDAC/TDBC film grown on glass. See M. S. Bradley, et al., *Adv. Mater.* 2005, 17, 1881. However, because the stamped film includes the transparent (across the visible spectrum) PDAC/PSS pretreatment layer, the overall density of dye in the final film was likely reduced.

The same analysis was performed on stamped PAH/TDBC films. FIGS. 3A-3E summarize the measurements and results of KK regression.

Stamped PAH/TDBC films can be made with large extinction coefficients and nanometer-scale thickness control, similar to PDAC/TDBC LBL J-aggregate thin films grown on glass. FIG. 3A-3F shows reflectance and transmittance data from a series of PAH/TDBC films stamped on glass along with the results of Kramers-Kronig regression on the 3 SICAS sample. The plot of the complex index of refraction shows that the 3 SICAS film has a very large peak extinction coefficient of K=5.46 at $\lambda$=594 nm, which corresponds to a peak thin film absorption coefficient of $\alpha$=1.2×$10^6$ cm$^{-1}$. Additionally, the plot of the calculated transmittance along with the measured transmittance shows that, comparable to PDAC/TDBC films grown on glass, there is minimal light scattering in the stamped PAH/TDBC films. The use of other polyelectrolytes for growing J-aggregates in solution has been studied extensively, and combined with recent work by Park et al. in studying the growth of LBL polyelectrolyte thin films on hydrophobic surfaces, these studies suggest that stamped LBL J-aggregate thin films using various dyes could be achieved through variation of the polyelectrolyte and growth conditions. See, for example, C. Peyratout, L. Daehne, *Phys. Chem. Chem. Phys.* 2002, 4, 3032, C. Peyratout, E. Donath, L. Daehne, *J. Photochem. Photobiol. A-Chem.* 2001, 142, 51, C. Peyratout, E. Donath, L. Daehne, *Photochem. Photobiol. Sci.* 2002, 1, 87, E. Rousseau, M. Van der Auweraer, F. C. De Schryver, *Langmuir* 2000, 16, 8865, E. Rousseau, M. M. Koetse, M. Van der Auweraer, F. C. De Schryver, *Photochem. Photobiol. Sci.* 2002, 1, 395, and J. Park, P. T. Hammond, *Macromolecules* 2005, 38, 10542, each of which is incorporated by reference in its entirety.

Figure 3A:
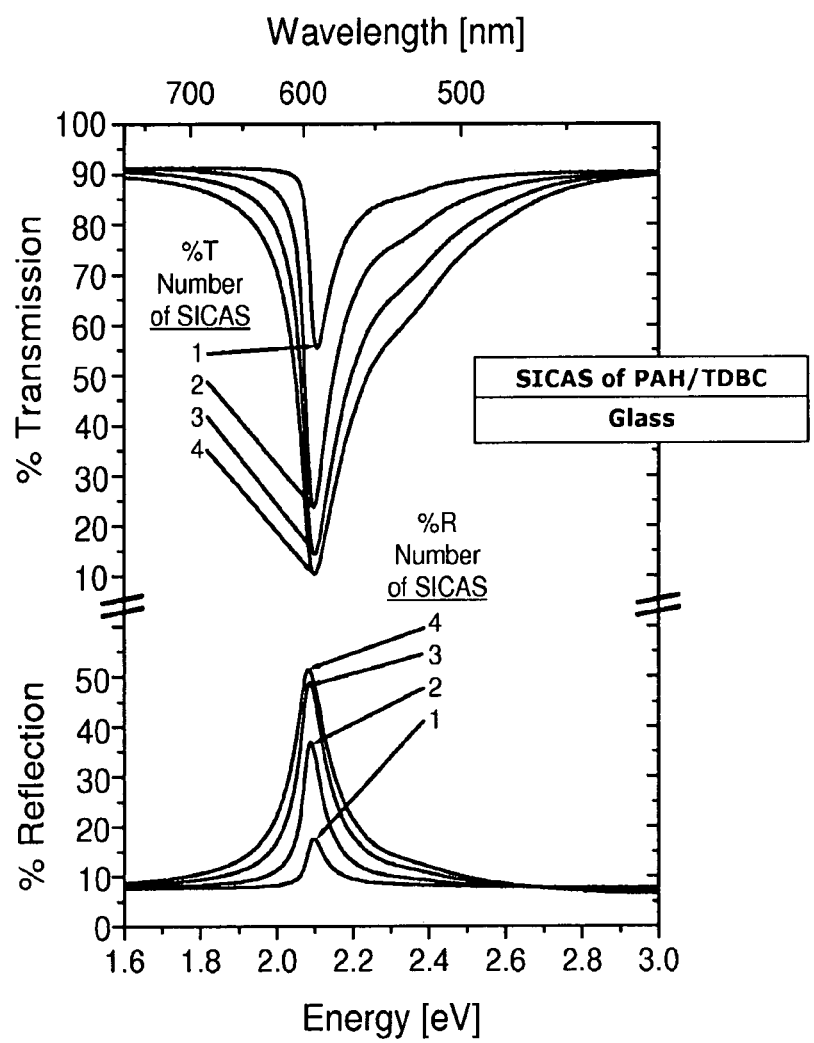
FIGS. 3A-3F are graphs depicting optical and physical properties of thin films.
Figure 3B:
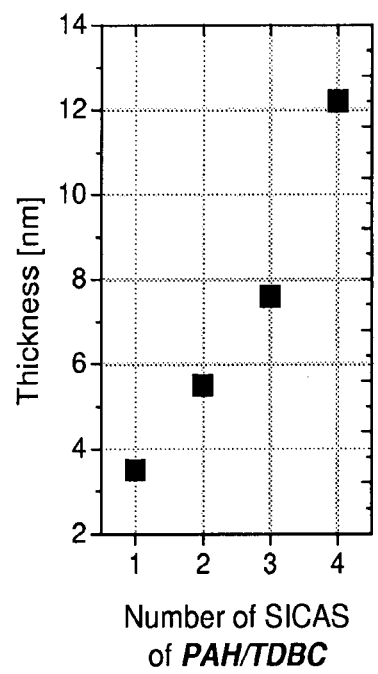
Figure 3C:
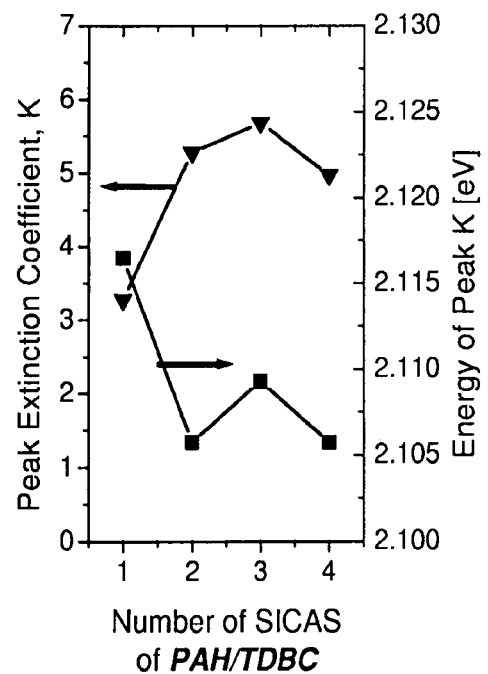
Figure 3D:
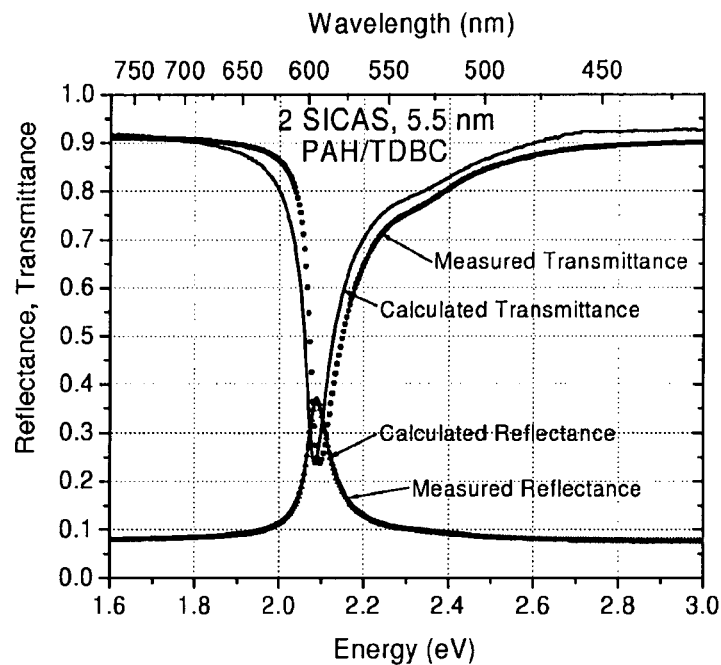
Figure 3E:
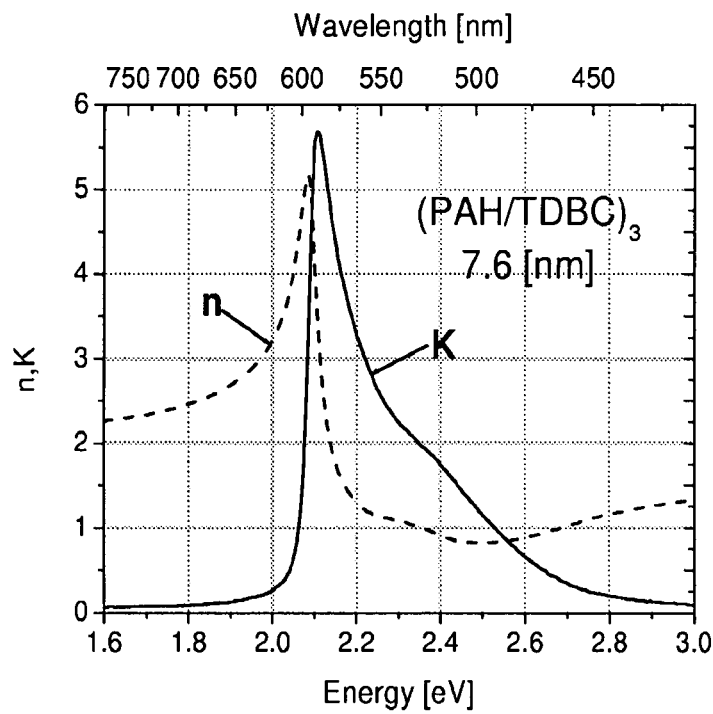
Figure 3F:
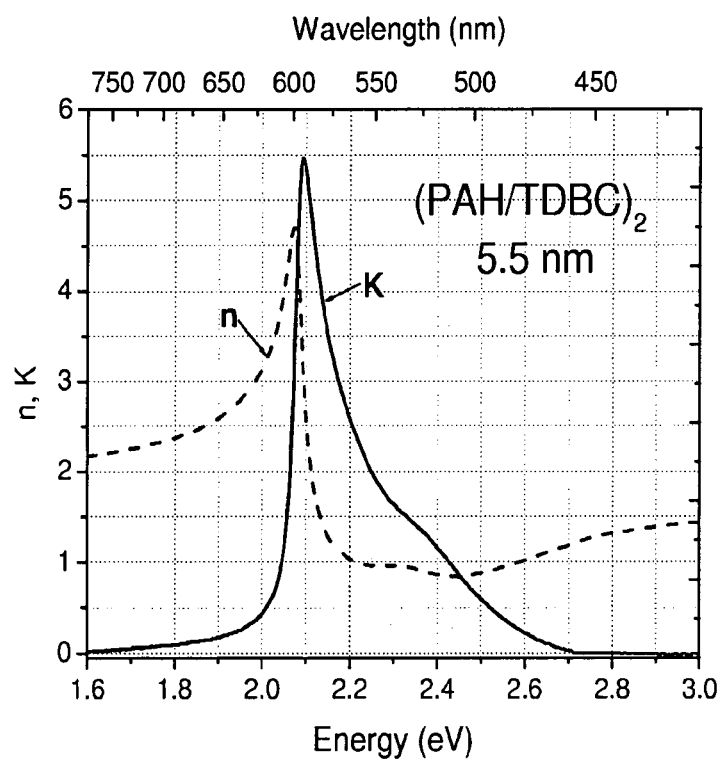

FIG. 3A shows reflectance and transmittance data for varying numbers of SICAS. FIG. 3B shows the measured thicknesses of the stamped films. FIG. 3C summarizes calculated and measured reflectance and transmittance data for stamped films. Due to the overlap of plotted data, the reflectance and transmittance data have been offset for clarity. FIG. 3D depicts measured reflectance and transmittance for 2 SICAS (5.5 nm thick film, measured with AFM) and calculated spectra. FIG. 3E plots the complex index of refraction for a 3 SICAS PAH/TDBC stamped film with a measured film thickness of 7.6 nm. FIG. 3F plots the complex index of refraction of the 2 SICAS PAH/TDBC stamped film.

The peak extinction coefficient of the 3 SICAS PAH/TDBC film was K=5.7 at $\lambda$=589 nm (FIG. 3E), which corresponded to a linear absorption constant of $\alpha$=1.2×$10^6$ cm$^{-1}$. The high linear absorption constant indicates a high density of dye in the film, which can in part be due to the enhanced adsorption of PAH to the PDMS stamp as compared to PDAC adsorption on treated PDMS. The smaller size of the PAH monomer compared to the PDAC monomer may contribute to a higher density of charged PAH sites which were balanced by a higher density of adsorbed anionic dye. Finally, the PAH/TDBC films did not have the additional PDAC/PSS layer from PDMS pretreatment.

As demonstrated in FIGS. 1B-1C, microcontact printing enabled in-plane patterning of the deposited J-aggregate films. Soft lithography using PDMS was first introduced in the 1990's. See, for example, A. Kumar, G. M. Whitesides, *Appl. Phys. Lett* 1993, 63, 2002; J. L. Wilbur, et al., *Adv. Mater.* 1994, 6, 600; A. Kumar, et al., *Langmuir* 1994, 10, 1498; B. D. Gates, et al., *Chem. Rev.* 2005, 105, 1171; M. Geissler, Y. N. Xia, *Adv. Mater.* 2004, 16, 1249; Y. N. Xia, et al., *Chem. Rev.* 1999, 99, 1823; and Y. N. Xia, G. M. Whitesides, *Annual Review of Materials Science* 1998, 28, 153, each of which is incorporated by reference in its entirety. Use of microcontact printing in patterning LBL stamped thin films was described in J. Park, P. T. Hammond, Adv. Mater. 2004, 16, 520. J-aggregate LBL thin films were patterned by growing the films on PDMS stamps that were been molded with a silicon master. In the microcontact printing process, portions of the J-aggregate thin film on the raised PDMS surfaces are transferred onto the substrate. FIGS. 1B and 1C show images of a patterned J-aggregate thin film, initially formed on PDMS and stamped onto glass. The 20 µm wide J-aggregate stripes showed edge roughness of less than 1 µm. This form of patterning J-aggregate thin films did not require film exposure to a reactive etch process or to solvents of the photoresist lithography, preserving the optical quality of the thin films.

To develop integrated photonic devices based on J-aggregates we need to develop techniques for generating patterned J-aggregate layers. Even simple J-aggregate patterns, like those shown in FIG. 4, can be challenging to reproduce, especially when the patterned film must be placed in a complex device structure. To avoid J-aggregate crystal damage due to lithographic patterning and wet/dry etching, microcontact printing (μCP) process can be used to generate J-aggregate patterns with better than 1 μm line accuracy. The μCP method preserves the optical quality of the deposited J-aggregate crystals and facilitates solvent-free incorporation of J-aggregate films into a device structure. Reduced exposure of sensitive device materials to solvents present in J-aggregate formation helps to improve the stability of devices incorporating LBL J-aggregate thin films.

Figure 4:
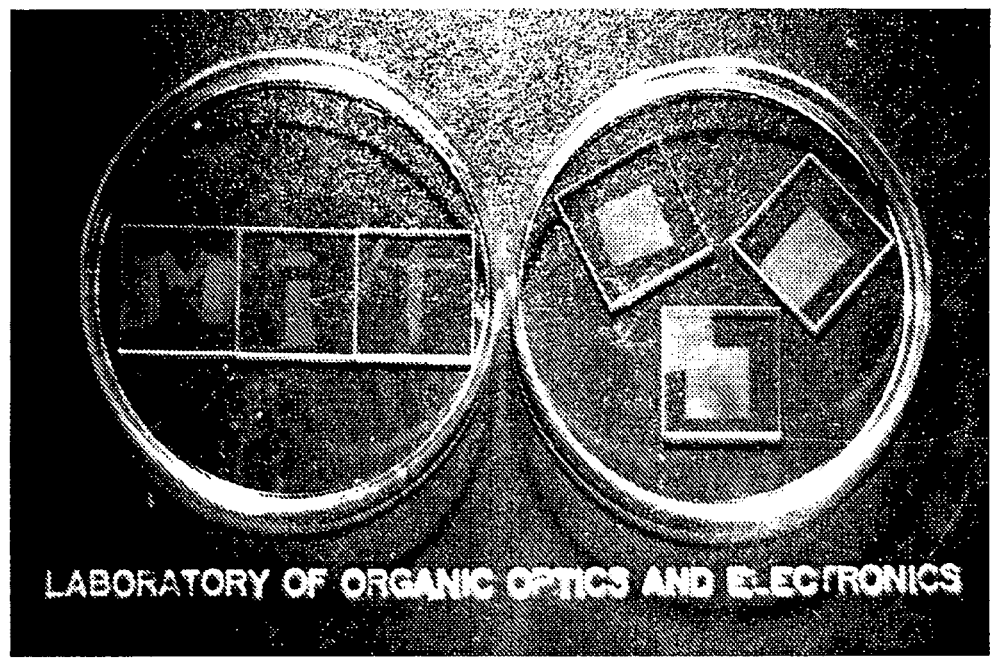
FIG. 4 is a photographs showing patterned thin films deposited on glass coverslips.

FIG. 4 demonstrates reflection of light from patterned PDAC/TDBC J-aggregate thin films. The films were transferred from PDMS stamps to desired regions of glass coverslips. FIG. 4 suggests the use of the films in labeling applications, for example, a patterned reflective film being used as a corporate logo on a product. By using a variety of dyes that have strong absorption and reflection at different wavelengths, different colors can be produced. Because each different color film can be applied in its own pattern, multicolor patterns can be produced.

Figure 5:
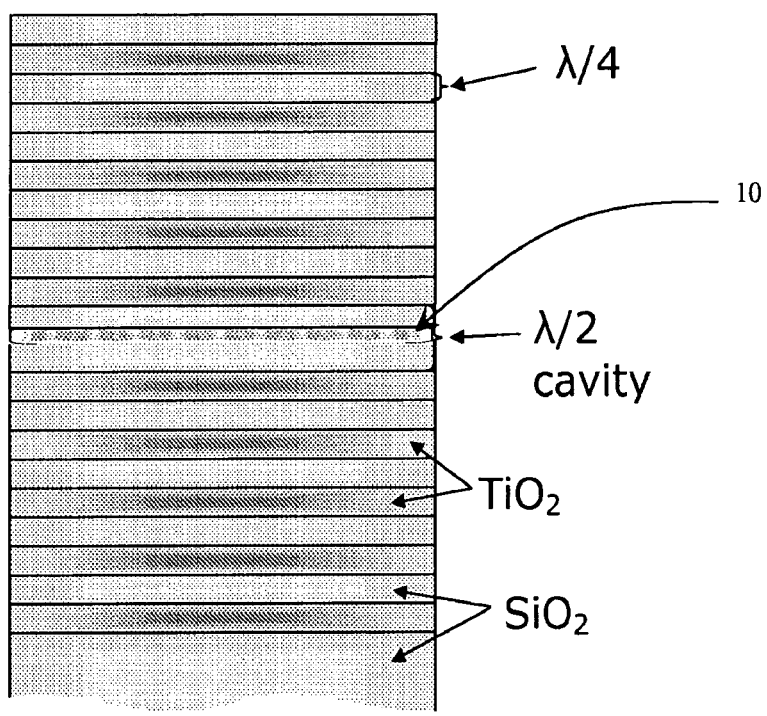
FIG. 5 is a schematic drawing depicting a layered structure including a J-aggregate-containing layer.
Figure 6:
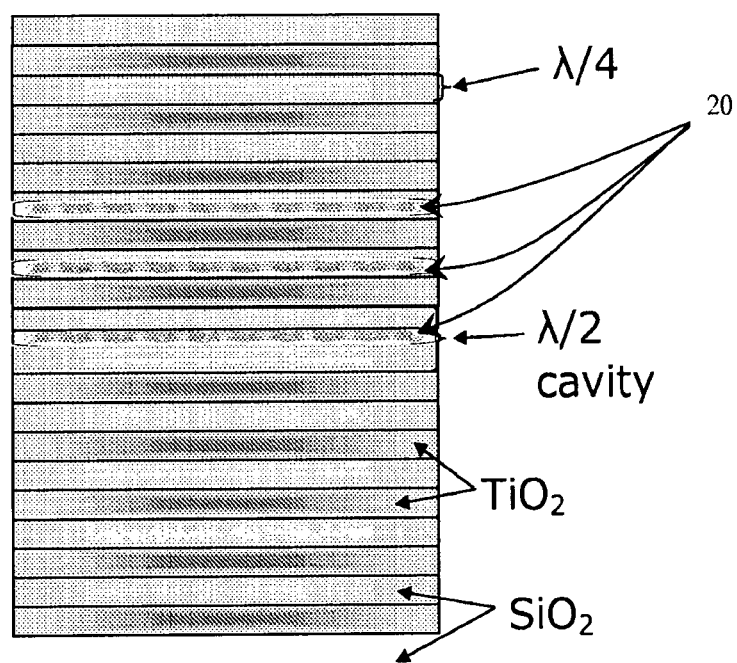
FIG. 6 is a schematic drawing depicting a layered structure including a plurality of J-aggregate-containing layers.

FIG. 5 illustrates a cavity device structure in which a layer-by-layer-deposited active layer thickness can be varied by building thick film out of many thin, stamped films, such as, for example, a TDBC J-aggregate thin film 10. Films built by these methods can have better homogeneity of film properties throughout deposited film thickness compared to other deposition methods. FIG. 6 illustrates a cavity device structure in which a plurality of active layers 20, for example, a layer-by-layer TDBC J-aggregate film, that can be deposited by stamping at cavity anti-node as well as at anti-nodes of electric field in mirror. Stamping can allow for film deposition in device without dipping device into water, which might otherwise damage other layers. As in the case of building a thick J-aggregate film by stamping, stamping these films provides better homogeneity since films are grown on stamps concurrently and then transferred into device structure. Integrating films into a mirror at electric field anti-nodes can increase excitonic dipole density in cavity, and thus Rabi splitting, since modal volume is not increased, i.e., more excitonic dipoles are supported in same optical volume, so nonlinear effects of light-matter strong coupling can be greater.

Other embodiments are within the scope of the following claims.

What is claimed is:

1. An optical device comprising a substrate and an non-covalent multilayer, wherein the non-covalent multilayer includes a first layer interacting with a second layer via electrostatic interactions, wherein the first layer includes a light-absorbing material on predetermined region of a surface of the substrate.

2. The device of claim 1, wherein the predetermined region includes a feature of a pattern of the non-covalent multilayer having a dimension of less than 1 millimeter.

3. The device of claim 1, wherein the predetermined region includes a feature of a pattern of the non-covalent multilayer having a dimension of less than 100 micrometers.

4. The device of claim 1, wherein the predetermined region includes a feature of a pattern of the non-covalent multilayer having a dimension of less than 1 micrometer.

5. The device of claim 1, wherein the light-absorbing material includes a J-aggregate.

6. The device of claim 5, wherein the J-aggregate includes a cyanine dye.

7. The device of claim 1, wherein the non-covalent multilayer includes a multiply charged species.

8. The device of claim 7, wherein the multiply charged species is a polyelectrolyte.

9. The device of claim 1, wherein the non-covalent multilayer has an absorption coefficient of at least $1\times10^5$ cm$^{-1}$.

10. The device of claim 1, wherein the non-covalent multilayer has an absorption coefficient of at least $5\times10^5$ cm$^{-1}$.

11. The device of claim 1, wherein the non-covalent multilayer has an absorption coefficient of at least $1\times10^6$ cm$^{-1}$.

12. The device of claim 1, wherein the non-covalent multilayer is crosslinked.

13. A light emitting device comprising:
a first electrode;
a second electrode opposed to the first electrode; and
a predetermined region arranged on a surface of the second electrode including a non-covalent multilayer including a light-absorbing material disposed between the first electrode and the second electrode.

14. The light emitting device of claim 13, wherein the predetermined region includes a feature of a pattern of the non-covalent multilayer having a dimension of less than 1 millimeter.

15. The light emitting device of claim 13, wherein the predetermined region includes a feature of a pattern of the non-covalent multilayer having a dimension of less than 100 micrometers.

16. The light emitting device of claim 15, wherein the predetermined region includes a feature of a pattern of the non-covalent multilayer having a dimension of less than 1 micrometer.

17. The light emitting device of claim 13, wherein the light-absorbing material includes a J-aggregate.

18. The light emitting device of claim 17, wherein the J-aggregate includes a cyanine dye.

19. The light emitting device of claim 13, wherein the non-covalent multilayer includes a multiply charged species.

20. The light emitting device of claim 19, wherein the multiply charged species is a polyelectrolyte.

21. The light emitting device of claim 13, wherein the non-covalent multilayer has an absorption coefficient of at least $1\times10^5$ cm$^{-1}$.

22. The light emitting device of claim 13, wherein the non-covalent multilayer has an absorption coefficient of at least $5\times10^5$ cm$^{-1}$.

23. The light emitting device of claim 13, wherein the non-covalent multilayer has an absorption coefficient of at least $1\times10^6$ cm$^{-1}$.

24. An optical device comprising a substrate and a non-covalent multilayer including a light-absorbing material on predetermined region of a surface of the substrate, wherein the non-covalent multilayer is adjacent to a light transmissive material having a substantially different index of refraction from an index of refraction of the non-covalent multilayer.

25. The device of claim 24, wherein the optical device is reflective at a wavelength where the non-covalent multilayer has an absorption coefficient of at least $1\times10^5$ cm$^{-1}$.

26. The device of claim 24, wherein the predetermined region corresponds to an image, letter, number, bar code, or combination thereof.

27. An optical device comprising a plurality of dielectric layers and a non-covalent multilayer between at least two of the dielectric layers, the non-covalent multilayer including a light-absorbing material, wherein the non-covalent multilayer is adjacent to a light transmissive material having a substantially different index of refraction from an index of refraction of the non-covalent multilayer.

28. The device of claim 27, further comprising a plurality of a non-covalent multilayers between at least two dielectric layers.

29. The device of claim 27, wherein the plurality of dielectric layers includes silica layers and titania layers.

\* \* \* \* \*